(12) United States Patent
Dong et al.

(10) Patent No.: US 10,643,342 B2
(45) Date of Patent: May 5, 2020

(54) GROUP OPTIMIZATION DEPTH INFORMATION METHOD AND SYSTEM FOR CONSTRUCTING A 3D FEATURE MAP

(71) Applicants: Haiwei Dong, Ottawa (CA); Yuan Ren, Vaughan (CA); Keyvan Golestan Irani, Newmarket (CA)

(72) Inventors: Haiwei Dong, Ottawa (CA); Yuan Ren, Vaughan (CA); Keyvan Golestan Irani, Newmarket (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 224 days.

(21) Appl. No.: 15/891,951

(22) Filed: Feb. 8, 2018

(65) Prior Publication Data

US 2019/0244378 A1 Aug. 8, 2019

(51) Int. Cl.
*G06T 7/55* (2017.01)
*H04N 5/247* (2006.01)
(Continued)

(52) U.S. Cl.
CPC .............. *G06T 7/55* (2017.01); *G05D 1/0246* (2013.01); *G06K 9/00624* (2013.01);
(Continued)

(58) Field of Classification Search
CPC ..................................... G06T 7/55; G06T 5/06
See application file for complete search history.

(56) References Cited

U.S. PATENT DOCUMENTS 5,179,441 A 1/1993 Anderson et al.
6,151,539 A 11/2000 Bergholz et al.
(Continued)

FOREIGN PATENT DOCUMENTS

CN 102045546 A 5/2011
CN 106529495 A 3/2017
(Continued)

OTHER PUBLICATIONS

Carlos Jaramillo et al., "Design and Analysis of a Single-Camera Omnistereo Sensor for Quadrotor Micro Aerial Vehicles (MAVs)", Proceedings of IEEE International Conference on Real-time Computing and Robotics, pp. 204-209, 2016.
(Continued)

*Primary Examiner* — Ross Varndell (57) ABSTRACT

A group optimization method for constructing a 3D feature map is disclosed. In one embodiment, the method comprises determining correspondence information for a plurality of environmental features for each image in a group of images in which a respective environmental feature is present and relative position and alignment of each camera. Depth information is determined for each environmental feature in the plurality of environmental features for each image in the group of images in which a respective environmental feature is present based on the correspondence information of the environmental features. Group optimized depth information is determined for each environmental feature in the plurality of environmental features using the determined depth information of each respective environmental feature.

23 Claims, 6 Drawing Sheets

(51) Int. Cl.
  *G05D 1/02* (2020.01)
  *G06T 5/00* (2006.01)
  *G06K 9/00* (2006.01)
  *H04N 13/00* (2018.01)

(52) U.S. Cl.
  CPC ............. *G06T 5/006* (2013.01); *H04N 5/247* (2013.01); *H04N 13/00* (2013.01); *G05D 2201/0213* (2013.01); *G06T 2207/10028* (2013.01)

(56) References Cited

U.S. PATENT DOCUMENTS

| | | | |
|---|---|---|---|
| 8,139,109 | B2 | 3/2012 | Schmiedel et al. |
| 2006/0018513 | A1 | 1/2006 | Sogawa |
| 2017/0109940 | A1 | 4/2017 | Guo et al. |
| 2018/0330526 | A1* | 11/2018 | Corcoran ................ G06T 11/60 |
| 2019/0129431 | A1* | 5/2019 | Yalla .................... G05D 1/0278 |

FOREIGN PATENT DOCUMENTS

| | | |
|---|---|---|
| CN | 106585623 A | 4/2017 |
| CN | 106799993 A | 6/2017 |

OTHER PUBLICATIONS

Zhigang Zhu, "Omnidirectional Stereo Vision", Proceedings of the 10th IEEE International Conference on Advanced Robotics, 2001.

Carlos Jaramillo et al., "A Single-Camera Omni-Stereo Vision System for 3D Perception of Micro Aerial Vehicles (MAVs)", Proceedings of the 8th IEEE Conference on Industrial Electronics and Applications, 2013.

* cited by examiner

Correspondence information

GROUP OPTIMIZATION DEPTH INFORMATION METHOD AND SYSTEM FOR CONSTRUCTING A 3D FEATURE MAP

TECHNICAL FIELD

The present disclosure relates to computer vision, and in particular, to a group optimization depth information method and system for constructing a 3D feature map.

BACKGROUND

Vehicle driver assistance systems that enhance the awareness and safety of human drivers and autonomous vehicles increase driver safety and convenience. Autonomous parking and driving are important aspects of autonomous vehicles. However, as with other aspects of autonomous vehicles, autonomous operations such as autonomous parking and driving remain a developing field and improvements in autonomous parking and driving are desirable.

Computer vision systems are an important component of a vehicle driver assistance systems and autonomous vehicles. One type of computer vision system is a stereo computer vision system that includes a front-facing stereo camera that consists of two lenses with a separate image sensor frame for each lens, each directed towards the front of the vehicle. A drawback of stereo computer vision systems is that only a portion of the side view of the vehicle is captured by the stereo camera even if wide angle lenses are used, and that the rear view of the vehicle is not captured by the stereo cameras at all. Although side and rear cameras may be present in some vehicle driver assistance systems and autonomous vehicles, the views from such cameras are typically not combined with the views from the front facing stereo camera and are not part of the computer vision system used for navigation (e.g., parking and driving). Instead, side cameras and rear cameras are used for other purposes such as localization, lane departure detection, collision avoidance, or other functions.

Another type of computer vision system is an omni vision system that consists of either a single monocular camera on a rotating carousel or a single omnidirectional camera. The drawback of omni vision systems is that captured images are nonlinearly highly distorted similar to a convex mirror. Typically, objects located farthest away from the center of the captured image are the most distorted whereas objects located closest to the center of the captured image are the least distorted. When compensating for such image distortion, less image data is available at the center of the captured image due to a high level of compression, resulting in uneven image distortion compensation and a high degree of inaccuracy around the center of the corrected image.

For the foregoing and other reasons, improvements in computer vision systems and alternatives to existing solutions are desirable.

SUMMARY

The present disclosure provides a group optimization depth information method and system for constructing a 3D feature map. Multiple distributed cameras with at least part of a common viewing area form a sensory network which may be used to determine depth information of environmental features for each camera. The depth information determined for a plurality of environment features from the perspective of different cameras is then calculated together by group optimization. By combining the group optimized depth information, a more accurate 3D feature map may be generated. The improved 3D feature map provides enhanced measurement accuracy by combining measurements from all distributed cameras in feature depth calculation, which may improve the accuracy and robustness of subsequent operations including but not limited to vehicle localization, path planning, object recognition and tracking. The method of the present disclosure may have wide applications, such as tracking a partially obscured object, localizing a target with high precision, and so on.

In accordance with one aspect of the present disclosure, there is provided a method of generating a three-dimensional (3D) feature map. The method comprises determining correspondence information for a plurality of environmental features for each image in a group of images in which a respective environmental feature is present, based on a relative position and alignment of each camera in a plurality of cameras. Depth information is determined for each environmental feature in the plurality of environmental features for each image in the group of images in which a respective environmental feature is present based on the correspondence information of the environmental features. Group optimized depth information is determined for each environmental feature in the plurality of environmental features using the determined depth information of each respective environmental feature.

In some examples, the method further comprises selecting a group of images from images captured by the plurality of cameras the group of images including one captured image for each camera in the plurality of cameras, which were captured at a common time.

In some examples, the method further comprises performing image distortion compensation on each image in the group of images based on intrinsic parameters of the respective cameras.

In some examples, the method further comprises rectifying each image in the group of images so that all images in the group of images have a common image plane.

In accordance with another aspect of the present disclosure, there is provided a computer vision system. The computer vision system comprises a processor, a memory coupled to the processor, and a plurality of cameras coupled to the processor. The cameras are located about a host object such as a vehicle. The plurality of cameras comprise at least two front facing cameras having a front facing view of an environment in which the object is located, at least one left side facing camera having a left side facing view of the environment in which the object is located, and at least one right side facing camera having a right side facing view of the environment in which the object is located. The memory has tangibly stored thereon executable instructions that, when executed by the processor, cause the computer vision system to perform the methods described above and herein.

In accordance with a further aspect of the present disclosure, there is provided a vehicle control system for a vehicle. The vehicle control system comprises a processor, a plurality of cameras coupled to the processor for capturing the environment around the vehicle, and a memory coupled to the processor. The memory stores executable instructions that, when executed by the processor, cause the vehicle control system to perform the methods described above and herein.

In accordance with a further aspect of the present disclosure, there is provided a vehicle comprising a mechanical system for moving the vehicle, a drive control system coupled to the mechanical system for controlling the mechanical system and a vehicle control system coupled to the drive control system, the vehicle control system having the features described above and herein.

In accordance with a yet further aspect of the present disclosure, there is provided a non-transitory machine readable medium having tangibly stored thereon executable instructions for execution by at a processor of a computer vision system. The computer vision system comprises the processor, a memory coupled to the processor, and a plurality of cameras coupled to the processor. The cameras are located about a host object such as a vehicle. The plurality of cameras comprises at least two front facing cameras having a front facing view of an environment in which the object is located, at least one left side facing camera having a left side facing view of the environment in which the object is located, and at least one right side facing camera having a right side facing view of the environment in which the object is located. The executable instructions, when executed by the processor, cause the computer vision system to perform the methods described above and herein.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments of methods and systems with reference to a motor vehicle, such as a car, truck, bus, boat or ship, submarine, aircraft, warehouse equipment, construction equipment, tractor or other farm equipment. The teachings of the present disclosure are not limited to vehicles, or any particular type of vehicle, and may be applied to other objects, real or virtual, and to vehicles that do not carry passengers as well as vehicles that do carry passengers. The teachings of the present disclosure may also be implemented in non-vehicular mobile robots including, but not limited to, autonomous vacuum cleaners, rovers, lawn mowers, unmanned aerial vehicle (UAV), and other objects.

Figure 1:
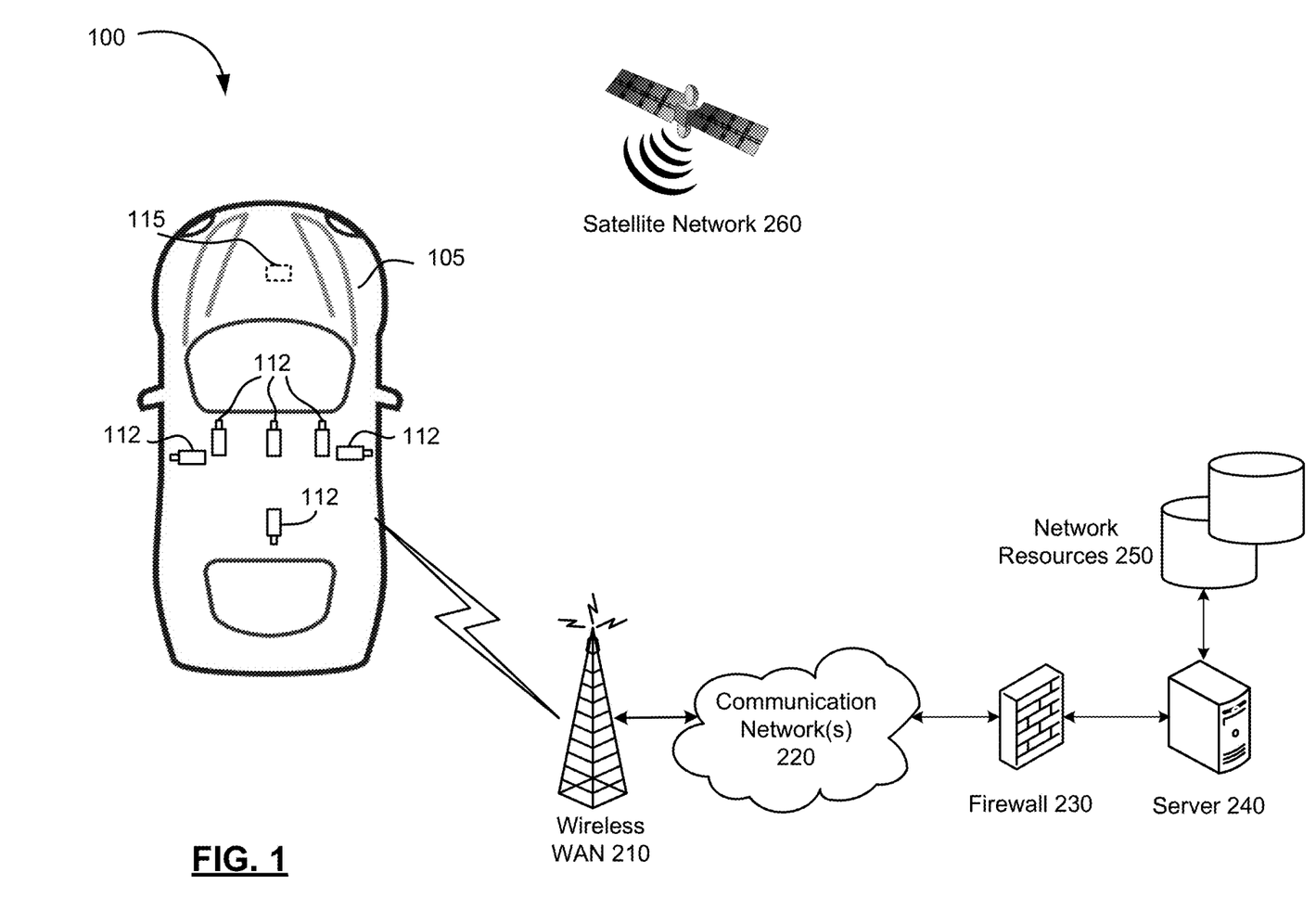
FIG. 1 is a schematic diagram of a communication system suitable for practicing example embodiments of the present disclosure.

FIG. 1 is a schematic diagram showing selected components of a communication system 100 in accordance with one example embodiment of the present disclosure. The communication system 100 comprises user equipment in the form of a vehicle control system 115 embedded in vehicles 105 (only one of which is shown in FIG. 1). The vehicle control system 115 is coupled to a drive control system 150 (FIG. 2) and a mechanical system 190 (FIG. 2) of the vehicle 105, as described below. The vehicle control system 115 allows the vehicle 105 to be operable in a fully-autonomous, semi-autonomous or fully user-controlled mode.

Figure 2:
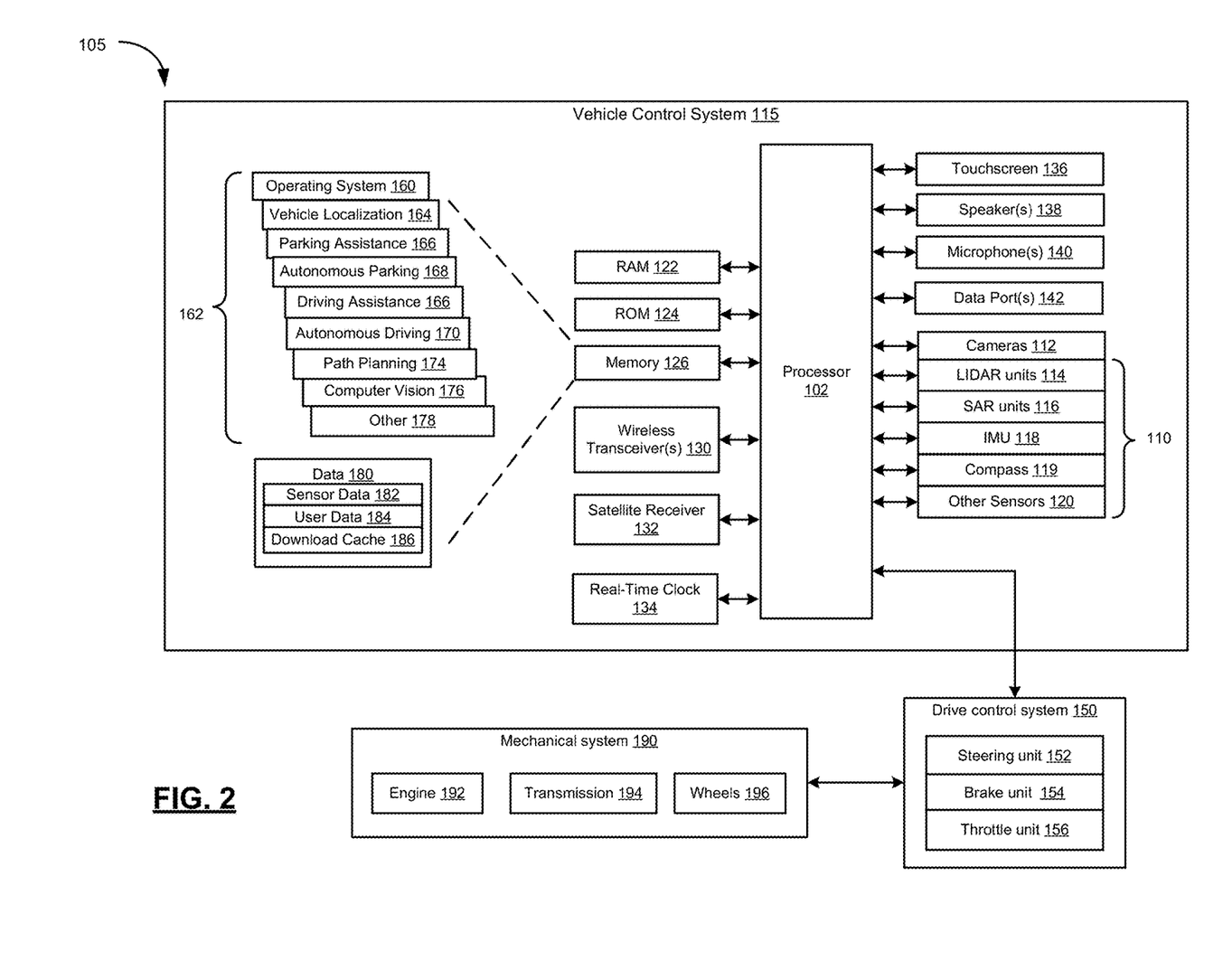
FIG. 2 is a block diagram of a vehicle comprising a vehicle control system in accordance with one example embodiment of the present disclosure.

The vehicle control system 115 provides a computer vision system comprising a plurality of digital cameras 112 located about the vehicle 105 each coupled to a controller, such as at least one processor 102, a memory 126 and control software such as a computer vision application 176, as described below. In the present embodiment, the cameras 112 are located at the front, rear, left side and right side of the vehicle 105 to capture the environment in front, rear, left side and right side of the vehicle 105. In the shown embodiment, two or more cameras 112 are located at the front of the vehicle 105 providing a front facing view, one camera 112 is located on the left side of the vehicle 105 providing a left side facing view, one camera 112 is located on the right side of the vehicle 105 providing a right side facing view, and one camera 112 is located rear of the vehicle 105 providing a rear facing view. The cameras 112 may be located on the roof of the vehicle 105 or elsewhere. A different number of cameras 112 may be provided at these locations in other embodiments. The cameras 112 may capture static images or videos comprising a series of consecutive frames. The cameras 112 are monocular cameras in at least some embodiments. The cameras 112 may capture visible light, infrared or both. The cameras 112 may be the same or different. For example, the image sensors, lenses or both may vary between cameras 112. For one example, some cameras 112, such as the front facing cameras, may have a higher resolution than the side and/or rear facing cameras. For another example, the focal length and/or depth of field may vary between cameras (e.g., some cameras may have a wide angle lens, others may have a telephoto lens, and yet others may be in-between). The cameras 112 are mounted or otherwise located to have different fields of view (FOVs) between adjacent cameras 112 to capture the environment surrounding the vehicle 105.

The FOVs of some or all of the adjacent cameras 112, possibly all of the cameras 112, are partially overlapping. In some examples, the left side camera and front left camera are partially overlapping, the front left camera and front center camera are partially overlapping, the front center camera and front right camera are partially overlapping, and the front right camera and right side camera are partially overlapping. In other examples, the left side camera and the right side camera and front center camera may also be partially overlapping. In further examples, the left side camera and front center camera may also be partially overlapping and the right side camera and front center camera may also be partially overlapping. In yet further examples, the left side camera and rear camera are partially overlapping and the right side and rear camera also partially overlapping.

In some embodiments, the cameras 112 may be part of a sensor unit 125 which scan the environment in front, rear, left side and right side of the vehicle 105. In such embodiments, the sensor units 125 comprise a plurality of sensors 110 in addition to the cameras 112. The plurality of sensors 110 of each sensor unit 125 may comprise a LIDAR unit 114, a radar unit such as a synthetic aperture radar (SAR) unit 116, an inertial measurement unit (IMU) 118, an electronic compass 119 and possibly other sensors 120. The sensors 110, when active, repeatedly (e.g., in regular intervals) sense information and provide the sensed information to the vehicle control system 115 in real-time or near real-time. An IMU 118 senses the vehicle's specific force and angular rate using a combination of accelerometers and gyroscopes. The vehicle control system 115 collects information using the cameras 112 and sensors 110 about a local environment of the vehicle 105 (e.g., any immediately surrounding obstacles) as well as information from a wider vicinity (e.g., the LIDAR units 114 and SAR units 116 may collect information from an area of up to 100 m radius around the vehicle 105). The vehicle control system 115 may also collect information about a position and orientation of the vehicle 105 using the sensors 110 such as the IMU 118. The vehicle control system 115 may determine a linear speed (e.g. odometer), angular speed, acceleration and tire grip of the vehicle 105, among other factors, using the IMU 118 and possibly other sensors 120.

The vehicle control system 115 may also comprise one or more wireless transceivers 130 that enable the vehicle control system 115 to exchange data and optionally voice communications with a wireless wide area network (WAN) 210 of the communication system 100. The vehicle control system 115 may use the wireless WAN 210 to access a server 240, such as a driving assist server, via one or more communications networks 220, such as the Internet. The server 240 may be implemented as one or more server modules and is typically located behind a firewall 230. The server 240 is connected to network resources 250, such as supplemental data sources that may be used by the vehicle control system 115.

The communication system 100 comprises a satellite network 260 comprising a plurality of satellites in addition to the WAN 210. The vehicle control system 115 comprises a satellite receiver 132 (FIG. 2) that may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Reference is next made to FIG. 2 which illustrates selected components of a vehicle 105 in accordance with an example embodiment of the present disclosure. As noted above, the vehicle 105 comprises a vehicle control system 115 that is connected to a drive control system 150 and a mechanical system 190. The vehicle 105 also comprises various structural elements such as a frame, doors, panels, seats, windows, mirrors and the like that are known in the art but that have been omitted from the present disclosure to avoid obscuring the teachings of the present disclosure. The processor 102 is coupled to a plurality of components via a communication bus (not shown) which provides a communication path between the components and the processor 102. The processor 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network 210, a satellite receiver 132 for receiving satellite signals from the satellite network 260, a real-time clock 134, and a touchscreen 136.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The real-time clock 134 may comprise a crystal oscillator that provides accurate real-time information, such as those provided by Atmel Corporation.

The touchscreen 136 comprises a display such as a color liquid crystal display (LCD), light-emitting diode (LED) display or active-matrix organic light-emitting diode (AMOLED) display, with a touch-sensitive input surface or overlay connected to an electronic controller. Additional input devices (not shown) coupled to the processor 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The drive control system 150 serves to control movement of the vehicle 105. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, received path information from a path planning system 174 stored in the memory 126 of the vehicle control system 115 and generate control signals to control the steering, braking and throttle of the vehicle 105, respectively to drive a planned path. The drive control system 150 may include additional components to control other aspects of the vehicle 105 including, for example, control of turn signals and brake lights.

The mechanical system 190 receives control signals from the drive control system 150 to operate the mechanical components of the vehicle 105. The mechanical system 190 effects physical operation of the vehicle 105. The mechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor 102. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus.

The memory 126 of the vehicle control system 115 has stored thereon operating system software 160 that is executed by the processor 102. The memory 126 also has stored thereon a number of software modules 162 in addition to the GUI, where each module 162 includes instructions that may be executed by the processor 102. The modules 162 include vehicle localization 164 module, parking assistance 166 module, autonomous parking 168 module, driving assistance 170 module for semi-autonomous driving, autonomous driving 172 module for fully autonomous driving, path planning module 174, computer vision module 176, and other modules 178. Other modules 178 include for example mapping module, navigation module, climate control module, media player module, telephone module and messaging module, etc. are also stored in the memory 126. The computer vision module 176, when executed by the processor 102, causes the operations of methods described herein to be performed.

Although shown as a separate modules that may be used by the parking assistance module 166, autonomous parking module 168, driving assistance module 170 for semi-autonomous driving, autonomous driving module 172 or path planning module 174, the computer vision module 176 may be combined with one or more of the other software modules in other embodiments.

The memory 126 also stores a variety of data 180. The data 180 may comprise sensor data 182 sensed by the sensors 110, user data 184 comprising user preferences, settings and optionally personal media files (e.g., music, videos, directions, etc.), and a download cache 186 comprising data downloaded via the wireless transceivers 130. The sensor data 182 may comprise image data from the cameras 112, LIDAR data from the LIDAR units 114, RADAR data from the SAR units 116, and possibly other sensor data from other sensors 120 such as the IMU 118. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

Figure 3:
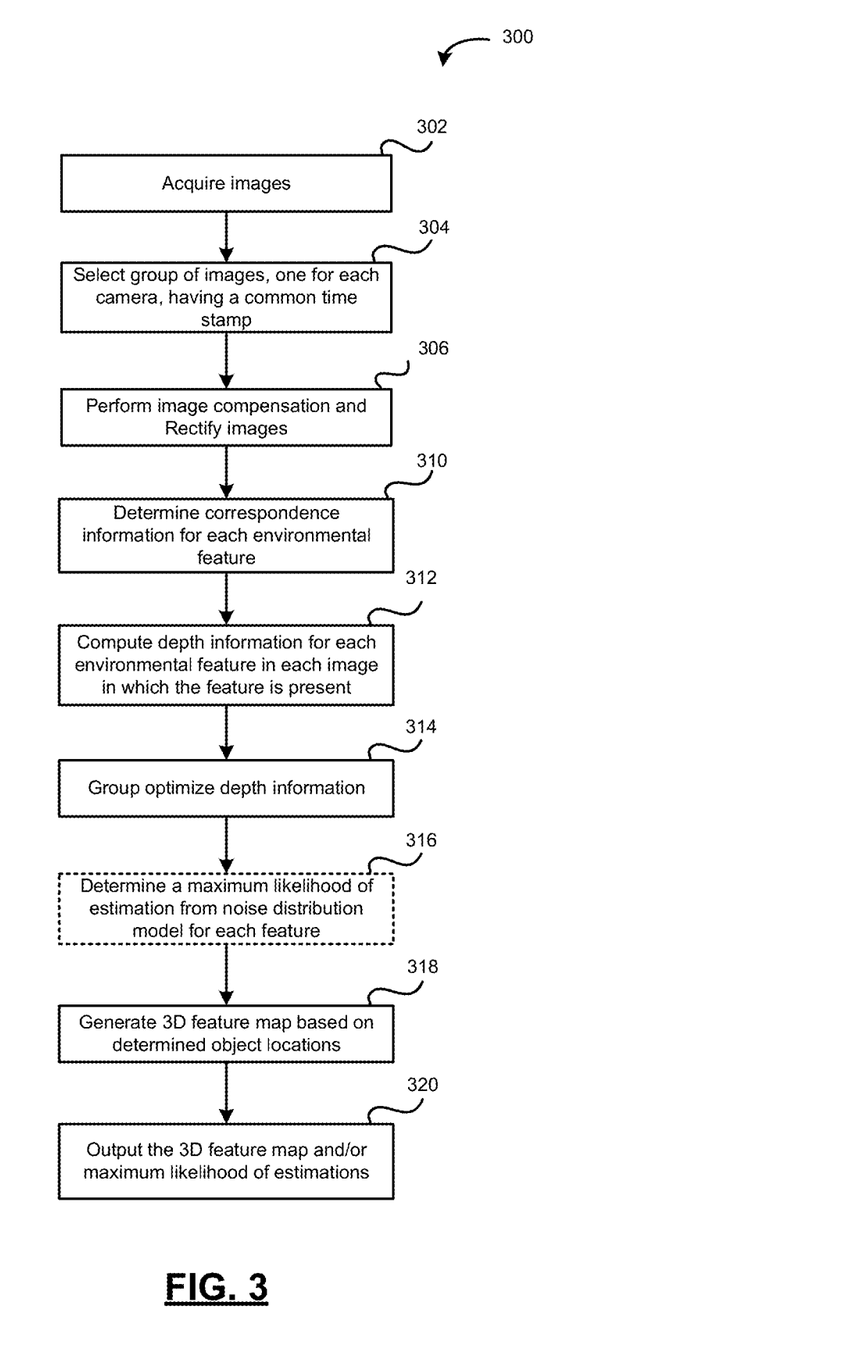
FIG. 3 is a flowchart of a method of generating a three-dimensional (3D) feature map of the environment in accordance with one example embodiment of the present disclosure.

Referring to FIG. 3, an example method 300 of generating a 3D feature map of the environment in which the vehicle 105 is located in accordance with one example embodiment of the present disclosure will be described. At least parts of the method 300 are carried out by software executed by a processor, such as the processor 102 of the vehicle control system 115.

At operation 302, a plurality of cameras 112 are used to capture images of the environment surrounding the vehicle 105 and store the captured images in memory, such as the memory 126 of vehicle control system 115. The plurality of cameras 112 used in the method 300 comprises at least two, preferably three or more, front facing cameras having a front facing view of an environment in which the vehicle 105 is located, at least one left side facing camera having a left side facing view of the environment in which the vehicle 105 is located, at least one right side facing camera having a right side facing view of the environment in which the vehicle 105 is located, a right side facing view of the environment in which the vehicle 105 is located, and at least one rear facing camera having a rear facing view of the environment in which the object is located. The FOVs of at least adjacent cameras 112 used in the method 300 are at least partially overlapping. Although more cameras 112 increase accuracy and robustness, it also increases the cost and complexity of the computer vision system. Because the vehicle 105 is most often moving forward, more front facing cameras covering the front view is typically technically advantageous and cost efficient.

The images may be captured as part of a stream, with each image representing a frame. The frame rate depends on the capabilities of the cameras 112, which may differ between cameras 112. The cameras 112 encode the captured images with metadata. The image metadata comprises a time stamp including a date and time the images were captured. The time stamp of the images captured by each of the cameras 112 is synchronized using a common clock, such as the real-time clock 134, so that images captured by the cameras 112 at the same time have the same time stamp. Alternatively, the clock may be part of the processor 102. The image metadata may also comprise identifying information about the camera 112 and camera settings such as aperture, shutter speed, ISO (International Standards Organization) number, focal depth, dots per inch (DPI), etc. Other automatically generated metadata include the camera brand and model Encoded image files are generated by the cameras 112 based on the captured images and stored in the memory 126, typically using a naming convention that allows images to be individually identified and selected in downstream processes. The naming convention may also be used to identify the camera 112 from which the image was captured, either directly or indirectly. For example, the image naming convention may include a camera identifier that identifies the camera 112 from which the image was captured. The image name may also be encoded in the image metadata. As an alternative, identifying information that identifies the camera 112 from which the image was captured may be encoded in the image metadata without being part of a naming convention. As another alternative, the processor 102 may identify the camera 112 from which the image was captured using the input path/port from which the image data is received, and stored image data for each camera 112 in a dedicated storage space in the memory 126.

Although the images have been described as being stored in the memory 126, it will be appreciated that images could be stored in an image buffer instead of the memory 126, or may be stored in the image buffer temporarily to increase system responsibilities before being stored in the memory 126. Other memory allocation schemes may also be used to optimize the operations, such memory allocation schemes being outside the scope of the present disclosure.

At operation 304, the processor 102 selects a group of images from the captured images, one captured image for each camera 112 in the plurality of cameras 112 used in the method 300, which were captured at a common time. The images are selected in accordance with a time stamp of each image such that images in the group of images were captured at a common time.

At operation 306, the processor 102 optionally performs distortion compensation for image distortion on each of the images in the group of images output from operation 304, as well as image rectification. The image distortion is caused by intrinsic parameters of the camera 112, for example image distortion caused by the image sensor or lens of a respective camera 112. Image rectification is required due to extrinsic parameters, namely because the cameras 112 used in the method 300 are not all aligned to be coplanar. Even with high-precision equipment and with the front cameras being substantially coplanar, perfect camera alignment is very difficult to achieve. Image rectification even between multiple cameras mounted not to be coplanar is considered to be more practical and effective than maintaining perfect alignment between cameras 112. The extrinsic parameters relate to relative rotation and translation between cameras 112 which determine a relative position and alignment (or orientation) between cameras 112.

Figure 4:
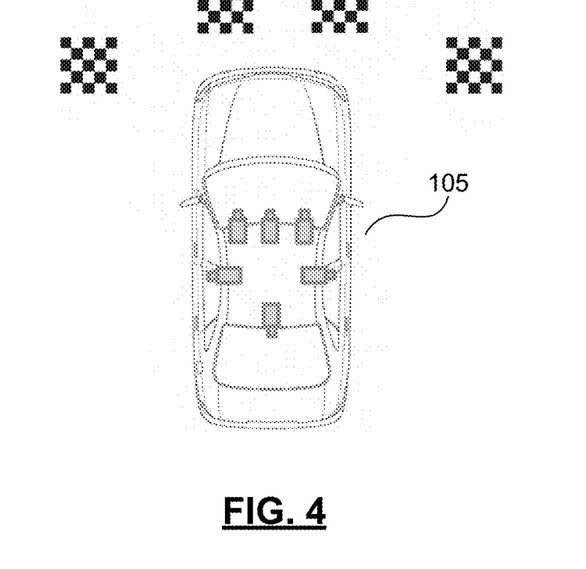
FIG. 4 is a schematic diagram illustrating a calibration setup in accordance with one example embodiment of the present disclosure.

The nature of the image distortion varies by camera 112. The image processing operations performed when compensating for image distortion and for image rectification may be determined during a calibration of the computer vision system/application. In one example, a suitable calibration pattern (e.g., chessboard) is placed at different locations around the vehicle 105 so as to be captured by each of the cameras 112 used in the method 300. FIG. 4 is a schematic diagram illustrating a calibration setup in accordance with one example embodiment of the present disclosure. By recognizing the same calibration pattern from each cameras viewpoint, each of the cameras 112 intrinsic parameters and extrinsic parameters may be determined and stored by the processor 102. It is important that calibration for extrinsic parameters for image rectification compensation be performed when the cameras 112 are mounted and aligned (oriented) on the vehicle 105 in the positions alignments (or orientations) in which the cameras 112 will be used.

Using the intrinsic parameters of the cameras 112, calibration coefficients to be used by the image processing operations (e.g., transformation operations) for image distortion compensation are determined by the processor 102 and stored in the memory 126 for use in real-time operations. Similarly, using the extrinsic parameters of the cameras 112 and the relative position and alignment (or orientation) of the cameras 112, calibration coefficients to be used by the image processing operations (e.g., transformation operations) for image rectification are determined by the processor 102 and stored in the memory 126 for use in real-time operations.

During image distortion compensation, geometric distortions of the images due to the intrinsic parameters of each camera 112 (e.g., barrel distortion and tangential distortion) are corrected or removed, either partially or completely. During image rectification, images in the group of images are transformed so that all of the images in the group of images have a common image plane. The common image plane may correspond to the image plane of one of the cameras 112, such as one of the front cameras 112. When image distortion compensation is performed first, geometric distortions are removed and image rectification may comprise a linear transformation. A rotation of x and y coordinate places the images on the same image plane, scaling makes the images the same size, and z coordinate rotation and skew adjustments make the image pixel rows aligned.

At operation 310, the processor 102 determines (e.g., calculates) correspondence information for environmental features in the images in the group of images for each image in the group of images in which the environmental features are present based on the mounting position and alignment of the cameras 112. A plurality of environmental features in a given image (or camera frame) is mapped to the corresponding feature in each of the other images in the group of images, if present. The correspondence information typically defines a series of locations in two dimensional (2D) space, similar to a map, defining coordinate locations (e.g., pixel locations) corresponding to a given environmental feature for each image in which the respective environmental feature appears.

Figure 6:
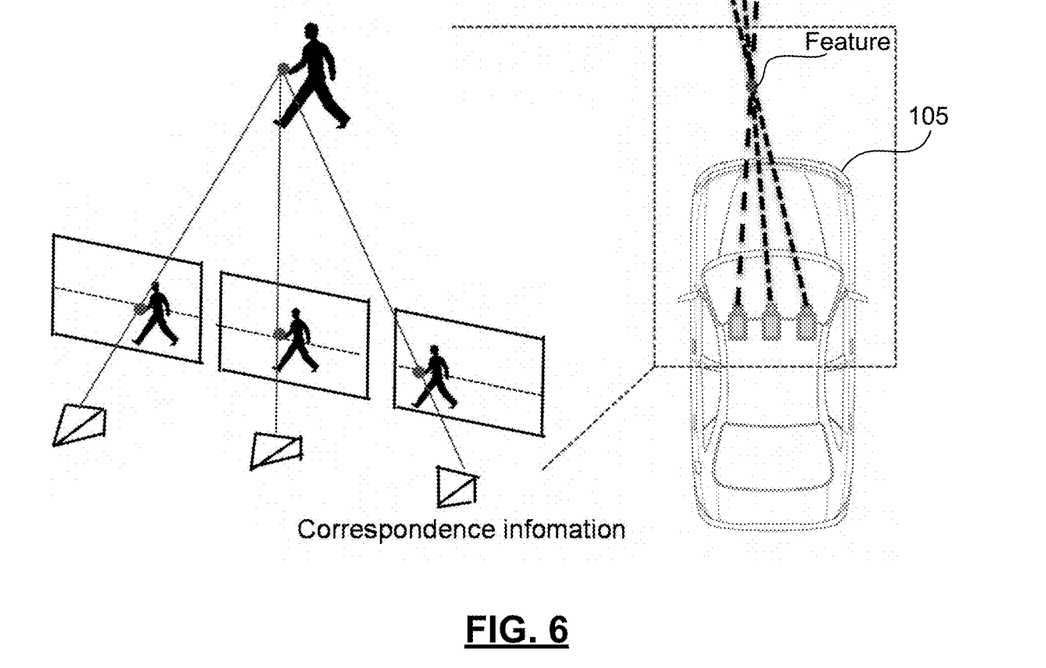
FIG. 6 is a schematic diagram illustrating correspondence information regarding an environmental feature viewed by different cameras each having a different field of view.

FIG. 6 is a schematic diagram illustrating correspondence information regarding an environmental feature viewed by different cameras each having a different field of view. In the shown example, an environmental feature captured by the front facing cameras 112 is a basketball held by a person. The location of the basketball and the person is slightly different in each of the different images (or camera frames) captured by the front facing cameras 112. Accordingly, the coordinate locations of the basketball and the person of these environmental features will also be different. Furthermore, it is likely that both of these environmental features will not be present in the images (or camera frames) captured by the cameras 112 the left side, right side or rear facing cameras 112 due to the size of these environmental features.

Image recognition is performed by the processor 102 to identify environmental features in each image. Environmental features are identifiable objects such as trees, buildings, bridges, roads, vehicles, people, animals, pillar/posts, curbs, street signs, lanes, stop lights, etc., and coordinate locations (e.g., x, y coordinates in the image data) of these objects in each of the images is determined and stored in memory, such as the memory 126. The coordinate locations of the environmental features may be defined by a matrix of pixel locations, or other suitable form. Next, using the relative position and alignment (or orientation) of the cameras 112 used in the method, in a spatial order of the cameras 112

(e.g., left-to-right, right-to-left, clockwise or counterclockwise), environmental features in each image are mapped to the corresponding feature in each of the other images in the group of images. The coordination locations of each environmental feature in the plurality of environment features in each image in which the respective environmental features are present provide positional or locational correspondence information.

Figure 5:
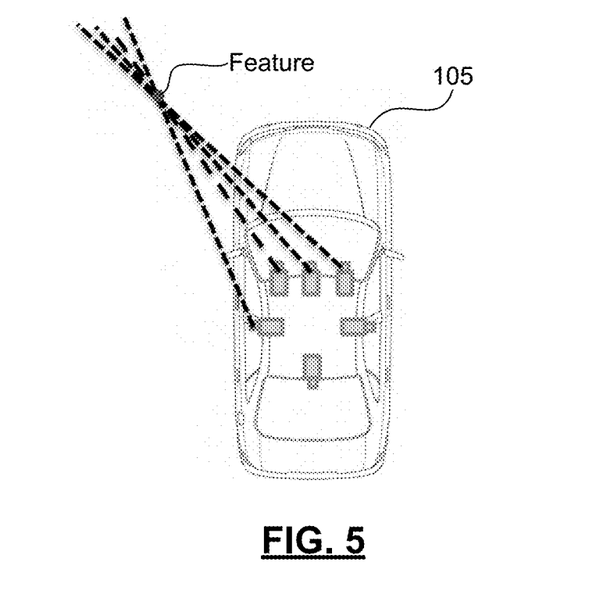
FIG. 5 is a schematic diagram illustrating an intersection point of an environmental feature viewed by different cameras each having a different field of view.

At operation 312, the processor 102 determines (e.g., calculates) depth information (also known as ranging information) or positional information of each environmental feature in the plurality of environment features for each image (e.g., for each camera 112) in the group of images in which a respective environmental feature appears (is present) from the correspondence information of the respective environmental feature by finding an intersection point in the images in the group of images in which the environmental feature appears and applying triangulation (also referred to as reconstruction) techniques using epipolar geometry. Epipolar geometry is commonly used in computer stereo vision. When two cameras view a three dimensional (3D) scene from two distinct positions, there are a number of geometric relations between the 3D points and the projections of the 3D points onto the two dimensional (2D) images captured by the cameras that lead to constraints between the image points. These relations are derived by approximating each of the cameras 112 by the pinhole camera model. FIG. 5 is a schematic diagram illustrating an intersection point of an environmental feature viewed by different cameras 112 each having a different field of view.

Figure 8:
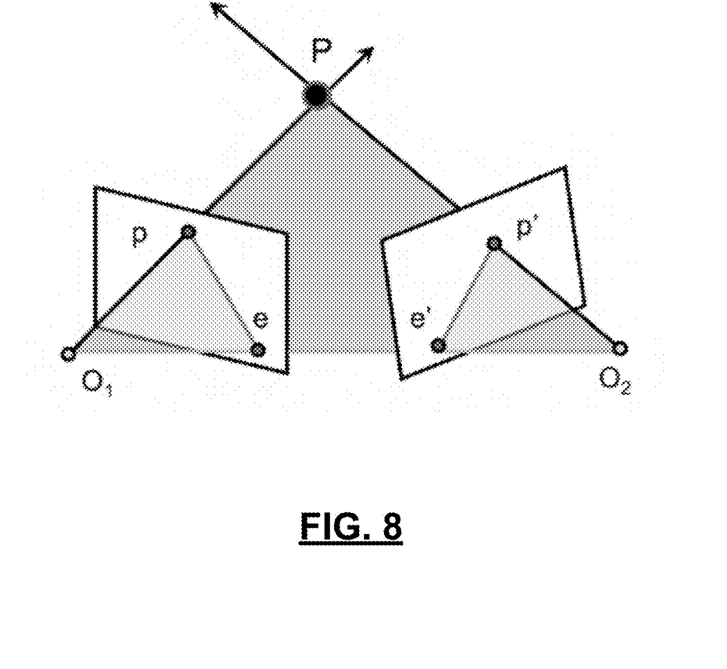
FIG. 8 is a schematic diagram illustrating epipolar geometry used in triangulation.

As illustrated in FIG. 8, the standard triangulation method using epipolar geometry calculation involves two cameras observing the same 3D point P, the intersection point, whose projection in each of the image planes is located at p and p' respectively. The camera centers are located at $O_1$ and $O_2$, and the line between the camera centers is referred to as the baseline. The lines between the camera centers $O_1$ and $O_2$ and the intersection point P are the projection lines. The plane defined by the two camera centers and P is the epipolar plane. The locations of wherein the baseline intersects the two image planes are known as the epipoles e and e'. The lines defined by the intersection of the epipolar plane and the two image planes are known as the epipolar lines. The epipolar lines intersect the baseline at the respective epipoles in the image plane. Given the corresponding image points p and p' and the geometry of the two camera, the projection lines can be determined, and the projection lines intersect at the 3D intersection point P. The 3D intersection point P can be determined using linear algebra in a straightforward way using known techniques.

Figure 9:
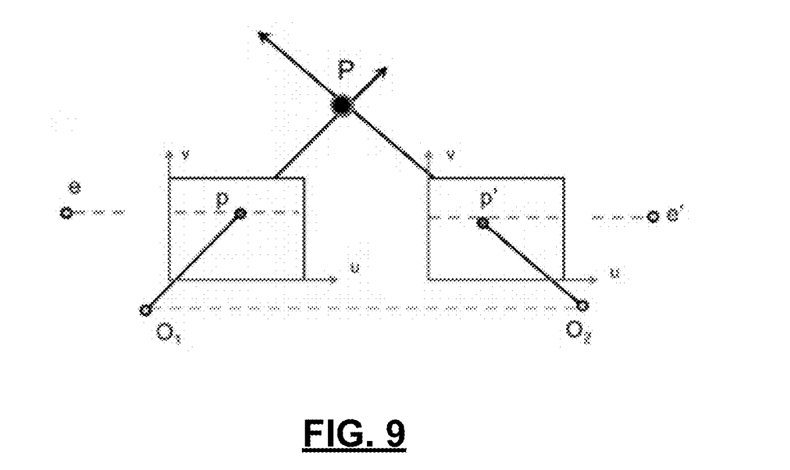
FIG. 9 is a schematic diagram illustrating epipolar geometry when the two image planes are parallel.

FIG. 9 illustrates epipolar geometry when the image planes are parallel to each other, such as after rectification as described above. When the image planes are parallel to each other, the epipoles e and e' are located at infinity since the baseline joining the centers $O_1$, $O_2$ is parallel to the image planes, and the epipolar lines are parallel to an axis of each image plane.

To perform triangulation, the parameters of the each camera projection function from 3D to 2D for each of the cameras involved is required. This may be represented by the camera matrices. A camera matrix or (camera) projection matrix is a 3×4 matrix that describes the mapping of a pinhole camera from 3D points in the world to 2D points in an image. If x is a representation of a 3D point in homogeneous coordinates (a 4-dimensional vector), and y is a representation of the image of this point in the pinhole camera (a 3-dimensional vector), the following relation holds:

$$y = Cx \qquad (1)$$

wherein C is the camera matrix, and C is defined by the following equation:

$$C = \begin{pmatrix} f & 0 & 0 & 0 \\ 0 & f & 0 & 0 \\ 0 & 0 & 1 & 0 \end{pmatrix} \qquad (2)$$

wherein f is the camera's focal length, wherein f>0.

Because each point in a 2D image corresponds to a line in 3D space, all points on the line in 3D are projected to the point in the 2D image. If a pair of corresponding points in two, or more images, may be found it must be the case that they are the projection of a common 3D point P, the intersection point. The set of lines generated by the image points must intersect at P (3D point) and the algebraic formulation of the coordinates of P (3D point) may be computed in a variety of ways, which are known in the art such as the mid-point method and direct linear transformation.

With front, side and rear view cameras surrounding the vehicle 105 and each two adjacent cameras have common viewing objects, the triangulation (e.g., depth calculation) may be performed for each two adjacent cameras in a clockwise (or counterclockwise) direction to obtain n depth measurements for n cameras 112. The operations begin with a first camera in the plurality of camera 112, which may be arbitrarily selected. In a given calculation, the last camera n and the first camera 1 will generate the n depth reading for the nth camera.

The depth information for each environmental feature typically comprises a series of locations in 3D space representing the respective environmental feature. However, in some embodiments the depth information for each environmental feature may consist of a point location in 3D space representing a center or nearest point of the respective environmental feature.

At operation 314, the processor 102 determines (calculates) group optimized depth information for each environmental feature in the plurality of environmental features using the depth information of each respective environmental feature calculated in operation 312. The operation 314 considers the depth information (or positional information) generated from images from all cameras 112 for each image in which the environmental features appear, like multiple eyes, based on the depth information (or positional information) of the respective environmental feature in each of captured images obtained in operation 312.

The group optimized depth information for each environmental feature typically comprises a series of locations in 3D space representing the respective environmental feature similar to the depth information calculated in operation 312. However, in some embodiments the group optimized depth information for each environmental feature may consist of a point location in 3D space representing a center or nearest point of the respective environmental feature.

Figure 7:
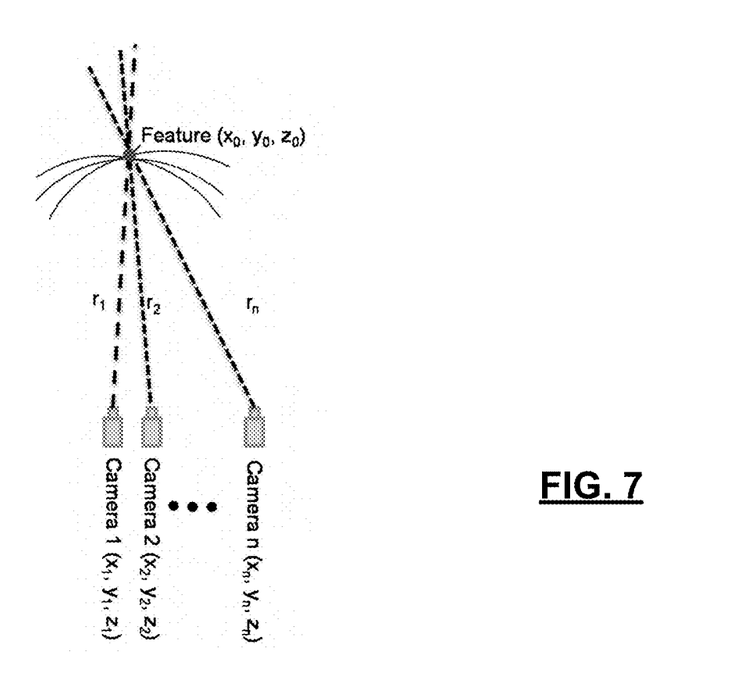
FIG. 7 is a schematic diagram illustrating depth calculation in accordance with one example embodiment of the present disclosure.

As best shown in FIG. 7, the group optimization models the view of each camera 112 in the plurality of cameras 112 as a sphere with the lens of the respective camera 112 at the center of each respective sphere, the center locations denoted $x_1, y_1, z_1, x_2, y_2, z_2$ and $x_3, y_3, z_3$ for cameras 1, 2 and 3 in FIG. 7, respectively, and with a radius equal to the depth of an environmental feature calculated in operation 312, the radii denoted $r_1$, $r_2$ and $r_3$ for cameras 1, 2 and 3 in FIG. 7, respectively. Because each sphere has the same intersection point, which is the environmental feature, having at location denoted $x_o$, $y_o$, $z_o$ in FIG. 7, the depth information may be optimized by solving a sphere equation set. The sphere equation set may be efficiently solved as a linear equation in the form of Ax=b or in non-linear form, examples of which are described below. The efficiency of the solution may be further enhanced by applying singular value decomposition (SVD) to efficiently compute the inverse of a matrix for linear and non-linear solutions.

Linear Example

One example of solving the sphere equation set as a linear equation in the form of Ax=b will now be described. For each camera 112, the view of each camera 112 in the plurality of cameras 112 may be modelled as a sphere with the lens of the camera 112 at the center of each respective sphere, the center locations denoted $x_2$, $y_2$, $z_2$ and $x_3$, $y_3$, $z_3$ for cameras 1, 2 and 3, respectively, and with a radius equal to the depth of an environmental feature calculated in operation 312, the radii denoted $r_1$, $r_2$ and $r_3$ for cameras 1, 2 and 3, respectively, as follows:

$$\begin{cases} (x_o - x_1)^2 + (y_o - y_1)^2 + (z_o - z_1)^2 = r_1^2 \\ (x_o - x_2)^2 + (y_o - y_2)^2 + (z_o - z_2)^2 = r_2^2 \\ \ldots \\ (x_o - x_n)^2 + (y_o - y_n)^2 + (z_o - z_n)^2 = r_n^2 \end{cases} \quad (3)$$

wherein $r_i$ is the radius for i=1 to n.

For any equation in (1), may be represented as:

$$(x_o - x_j + x_j - x_i)^2 + (y_o - y_j + y_j - y_i)^2 + (z_o - z_j + z_j - z_i)^2 = r_i^2 \quad (4)$$

wherein i refers the $i^{th}$ camera and j refers the $j^{th}$ camera. Equation (2) in turn may be represented as:

$$(x_o - x_j)(x_j - x_i) + (y_o - y_j)(y_j - y_i) + (z_o - z_j)(z_j - z_i) = \tfrac{1}{2}(r_j^2 - r_i^2 + l_{ij}^2) \quad (5)$$

wherein $l_{ij}$ is the distance between the center of the $i^{th}$ and $j^{th}$ camera 112.

By applying equation (5) to all equations in (3), the following equation set is obtained:

$$\begin{cases} (x_o - x_1)(x_2 - x_1) + (y_o - y_1)(y_2 - y_1) + \\ \quad (z_o - z_1)(z_2 - z_1) = \tfrac{1}{2}(r_1^2 - r_2^2 + l_{21}^2) \\ (x_o - x_1)(x_3 - x_1) + (y_o - y_1)(y_3 - y_1) + \\ \quad (z_o - z_1)(z_3 - z_1) = \tfrac{1}{2}(r_1^2 - r_3^2 + l_{31}^2) \\ \ldots \\ (x_o - x_1)(x_n - x_1) + (y_o - y_1)(y_n - y_1) + \\ \quad (z_o - z_1)(z_n - z_1) = \tfrac{1}{2}(r_1^2 - r_n^2 + l_{n1}^2) \end{cases} \quad (6)$$

The equations in (4) may be re-written in matrix form to obtain a commonly-used linear equation set:

$$Ax = b \quad (7)$$

wherein $$A = \begin{bmatrix} x_2 - x_1, y_2 - y_1, z_2 - z_1 \\ x_3 - x_1, y_3 - y_1, z_3 - z_1 \\ \ldots \\ x_n - x_1, y_n - y_1, z_n - z_1 \end{bmatrix} \quad (8)$$

$$x = \begin{bmatrix} (x_o - x_1) \\ (y_o - y_1) \\ \ldots \\ (z_o - z_1) \end{bmatrix} \quad (9)$$

$$b = \begin{bmatrix} \tfrac{1}{2}(r_1^2 - r_2^2 + l_{21}^2) \\ \tfrac{1}{2}(r_1^2 - r_3^2 + l_{31}^2) \\ \ldots \\ \tfrac{1}{2}(r_1^2 - r_n^2 + l_{n1}^2) \end{bmatrix} \quad (10)$$

Thus, the solution is:

$$x = A^+ b = (A^T A)^{-1} A^T b \quad (11)$$

wherein $A^+$ is the pseudoinverse of matrix A, a generalization of the inverse matrix, such as a Moore-Penrose inverse.

The vector x is a 3D coordinate representing a group optimized depth (or position) of a 2D coordinate location (pixel location) of an environmental feature based on the depth information (positional information) for each image in which the environmental feature is present. To generate a full 3D map of a given environmental feature, processing is performed for the remaining 2D coordinate locations (pixel locations) of the given environmental feature. To generate a full 3D map of the environment surrounding the vehicle 105, processing is performed for the other environmental features identified in the images. The group optimized depth (or position) is believed to provide an improved depth (or position) estimation of environmental features.

Non-Linear Example

One example of group optimization of the depth information in non-linear form will now be described. Referring to FIG. 7, the observation error for each camera 112 may be written as:

$$f_i = \sqrt{(x_o - x_i)^2 + (y_o - y_i)^2 + (z_o - z_i)^2} - r_i^2 \quad (12)$$

wherein i refers the $i^{th}$ camera.

A cost function F is defined as $\Sigma_{i=1}^{n} f_i^2$. The objective is to minimize the observation error in the least squared sense:

$$\min F = \min \Sigma_{i=1}^{n} f_i^2 \quad (13)$$

The partial derivative along the x, y and z directions may be derived as:

$$\begin{cases} \dfrac{dF}{dx} = 2 \sum_{i=1}^{n} f_i \dfrac{df_i}{dx} \\ \dfrac{dF}{dy} = 2 \sum_{i=1}^{n} f_i \dfrac{df_i}{dy} \\ \dfrac{dF}{dz} = 2 \sum_{i=1}^{n} f_i \dfrac{df_i}{dz} \end{cases} \quad (14)$$

Equation 12 may be re-written in matrix form:

$$\begin{bmatrix} \frac{dF}{dx} \\ \frac{dF}{dy} \\ \frac{dF}{dz} \end{bmatrix} = 2J \cdot f \quad (15)$$

wherein $$J = \begin{bmatrix} \frac{df_1}{dx} & \frac{df_1}{dy} & \frac{df_1}{dz} \\ \frac{df_2}{dx} & \frac{df_2}{dy} & \frac{df_2}{dz} \\ & \cdots & \\ \frac{df_n}{dx} & \frac{df_n}{dy} & \frac{df_n}{dz} \end{bmatrix} \quad (16)$$

$$f = \begin{bmatrix} f_1 \\ f_2 \\ \cdots \\ f_n \end{bmatrix} \quad (17)$$

Iteration is used to gradually decrease the cost function in (13). If the feature location is defined as P wherein $$P = \begin{bmatrix} x_0 \\ y_0 \\ z_0 \end{bmatrix} \quad (18)$$

and k and k+1 are k's and k+1's iteration, then the feature location at k+1's iteration is calculated as:

$$P_{k+1} = P_k - (J_k^T J_k)^{-1} J_k^T f_k \quad (19)$$

The vector $P_{k+1}$ is a 3D coordinate representing a group optimized depth position of a 2D coordinate location (pixel location) of an environmental feature based on the depth information (positional information) for each image in which the environmental feature is present. To generate a full 3D map of a given environmental feature, processing is performed for the remaining 2D coordinate locations (pixel locations) of the given environmental feature. To generate a full 3D map of the environment surrounding the vehicle 105, processing is performed for the other environmental features identified in the images. The group optimized depth (or position) is believed to provide an improved depth (or position) estimation of environmental features.

The iteration stops when cost function is smaller than a threshold, which is set by a designer based on desired accuracy:

$$F_{k+1} - F_k < \text{threshold} \quad (20)$$

At operation 316, the processor 102 optionally calculates a maximum likelihood estimation in accordance with a noise distribution model for each feature in each image in which the feature appears. Techniques for calculating the maximum likelihood estimation in accordance with a noise distribution model are known in the art of computer stereo vision, such as perspective-n-point. The maximum likelihood estimation is an estimate of the maximum likelihood (or probability) that the group optimized depth information (positional information) calculated in operation 314 matches the actual depth (positional) information of the environmental feature in the image. In some examples, the images in the group of images are modelled as displaced versions of a common deterministic signal with noise added to each image when the disparity between the images is a deterministic, unknown parameter. A set of measurements is defined as functions of the unknown disparity, formulating a probability density of the measurements conditioned on the disparity, and determining the disparity estimate that maximizes the probability of the measurements. The intensity differences between the images with a threshold around pixels corresponding to the same feature are used as the basis for the maximum likelihood estimation.

At operation 318, the processor 102 generates an optimized three-dimensional (3D) feature map of the environment in which the vehicle 105 is located from the group optimized depth information calculated in operation 314.

At operation 320, the processor 102 outputs the 3D feature map from the computer vision system. The output may comprise displaying the 3D feature map of the environment in which the object is located on a display such as the touchscreen 136, outputting the 3D feature map of the environment in which the object is located to a vehicle driver assistance system or autonomous vehicle system, or a combination thereof. The vehicle driver assistance system or autonomous vehicle system is typically part of the vehicle control system 115, and may be implemented in software as described above. The maximum likelihood estimations for each feature may also be output with the 3D feature map. The maximum likelihood estimations may be displayed on the touchscreen 136 along with the 3D feature map. The maximum likelihood estimations may also be used by the vehicle driver assistance system or autonomous vehicle system, for example, when performing vehicle localization, path planning, parking assistance, autonomous parking, driving assistance for semi-autonomous driving, or fully autonomous driving, among other possible functions.

The present disclosure provides a group optimization depth information method and system for constructing a 3D feature map. Multiple distributed cameras with at least part of a common viewing area form a sensory network which may be used to determine depth information of environmental features for each camera. The depth information determined for each environment feature in the plurality of environment features from the perspective of different cameras 112 is calculated together by group optimization. By combining the group optimized depth information, a more accurate 3D feature map may be generated. The improved 3D feature map provides enhanced measurement accuracy by combining measurements from all distributed cameras in feature depth calculation, which may improve the accuracy and robustness of subsequent operations including but not limited to vehicle localization, path planning, and object recognition and tracking. The method of the present disclosure may have wide applications, such as tracking a partially obscured object, localizing a target with high precision, and so on.

The coding of software and software modules for carrying out the above-described methods described is within the scope of a person of ordinary skill in the art having regard to the present disclosure. Executable instructions of software code or and software modules for execution by one or more processors of one or more respective devices to perform the above-described method may be stored in a machine-readable medium as the memory of the vehicle control system. The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified. Although the processor 102 is described as performing many of the operations of the method 300, one or more dedicated digital signal processors (DSPs), graphical processing units (GPU), or image processors may be used to perform some of the described operations. The particular processing entity that performs the described operations is not intended to be restrictive to the present disclosure.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer vision system, comprising:
a processor;
a plurality of cameras coupled to the processor, wherein the plurality of cameras are located about a host object, the plurality of cameras comprising at least two front facing cameras having a front facing view of an environment in which the object is located, at least one left side facing camera having a left side facing view of the environment in which the object is located, at least one right side facing camera having a right side facing view of the environment in which the object is located, and at least one rear facing camera having a rear facing view of the environment in which the object is located;
a memory coupled to the processor, the memory tangibly storing thereon executable instructions that, when executed by the processor, cause the computer vision system to:
select a group of images from images captured by the plurality of cameras, the group of images including one captured image for each camera in the plurality of cameras, which were captured at a common time;
perform image distortion compensation on each image in the group of images based on intrinsic parameters of the respective camera that captured the image;
rectify each image in the group of images so that all images in the group of images have a common image plane;
determine correspondence information for a plurality of environmental features for each image in the group of images in which a respective environmental feature is present based on a relative position and alignment of each camera in the plurality of cameras;
determine depth information for each environmental feature in the plurality of environmental features for each image in the group of images in which a respective environmental feature is present based on the correspondence information of the environmental features; and
determine group optimized depth information for each environmental feature in the plurality of environmental features using the determined depth information of each respective environmental feature.

2. The computer vision system of claim 1, wherein the executable instructions, when executed by the processor, cause the computer vision system to generate a three-dimensional (3D) feature map of the environment in which the object is located based on the group optimized depth information of each environmental feature in the plurality of environmental features.

3. The computer vision system of claim 2, wherein the executable instructions, when executed by the processor, cause the computer vision system to display the 3D feature map of the environment in which the object is located on a display.

4. The computer vision system of claim 2, wherein the executable instructions, when executed by the at least one processor, cause the computer vision system to output the 3D feature map of the environment in which the object is located to a vehicle driver assistance system or autonomous vehicle system.

5. The computer vision system of claim 1, wherein the executable instructions, when executed by the processor, cause the computer vision system to calculate a maximum likelihood estimation in accordance with a noise distribution model for each environmental feature in each image in which the environmental feature appears.

6. The computer vision system of claim 5, wherein the executable instructions, when executed by the processor, cause the computer vision system to output the maximum likelihood estimations for each environmental feature to a vehicle driver assistance system or autonomous vehicle system.

7. The computer vision system of claim 1, wherein the executable instructions, when executed by the processor, cause the computer vision system to, when selecting the group of images from the captured images, one captured image for each camera in the plurality of cameras in accordance with a time stamp of each image such that images in the group of images were captured at a common time.

8. The computer vision system of claim 1, wherein each camera has a different field of view, and wherein adjacent cameras have at least partially overlapping fields of view.

9. The computer vision system of claim 1, wherein the correspondence information defines a series of locations in two dimensional (2D) space defining coordinate locations corresponding to a respective environmental feature for each image in which the respective environmental feature is present.

10. The computer vision system of claim 1, wherein the depth information and group optimized depth information for each environmental feature comprises a series of locations in 3D space representing the respective environmental feature.

11. The computer vision system of claim 1, wherein the depth information and group optimized depth information for each environmental feature consists of a point location in 3D space representing a center or nearest point of the respective environmental feature.

12. The computer vision system of claim 1, wherein for a respective location in the correspondence information for a respective environmental feature, a group optimized depth is determined, wherein the group optimized depth is defined by a vector x defined according to the following equation:

$$x = \begin{bmatrix} (x_o - x_1) \\ (y_o - y_1) \\ \dots \\ (z_o - z_1) \end{bmatrix}$$

wherein the vector x is calculated in accordance with the following equation:

$$x = A^+ b = (A^T A)^{-1} A^T b$$

wherein $A^+$ is the pseudoinverse of matrix A;
wherein the matrix A and the matrix b are calculated in accordance with the following equations:

$$A = \begin{bmatrix} x_2 - x_1, y_2 - y_1, z_2 - z_1 \\ x_3 - x_1, y_3 - y_1, z_3 - z_1 \\ \dots \\ x_n - x_1, y_n - y_1, z_n - z_1 \end{bmatrix}, b = \begin{bmatrix} \frac{1}{2}(r_1^2 - r_2^2 + l_{21}^2) \\ \frac{1}{2}(r_1^2 - r_3^2 + l_{31}^2) \\ \dots \\ \frac{1}{2}(r_1^2 - r_n^2 + l_{n1}^2) \end{bmatrix},$$

wherein $x_1, y_1, z_1, x_2, y_2, z_2 \dots x_n, y_n, z_n$ denote the center location of each camera 1 to n, respectively, wherein n is the number of cameras in which the respective environmental feature is observed, $x_o, y_o, z_o$ denotes a 3D location of the environmental feature corresponding to the respective location in the correspondence information, $r_1, r_2$ and $r_n$ denote the distance from the center location of each camera 1 to n to the respective intersection point $x_o, y_o, z_o$, and wherein $l_{21}, l_{31} \dots l_{n1}$ is the distance between the center location of the camera 1 and the center location of a camera i in which the respective environmental feature is observed, wherein $i=2 \dots n$.

13. The computer vision system of claim 1, wherein for a respective location in the correspondence information for a respective environmental feature, a group optimized depth is determined, wherein the group optimized depth is determined by:
calculating an observation error, f, for each camera in which a respective environmental feature is observed accordance with the following equation $$f_i = \sqrt{(x_o - x_i)^2 + (y_o - y_i)^2 + (z_o - z_i)^2} - r_i^2$$

wherein i refers the $i^{th}$ camera in which a respective environmental is observed,
wherein $x_i, y_i, z_i$ denotes the center location of the $i^{th}$ camera, wherein $i=1 \dots n$, wherein n is the number of cameras in which the respective environmental feature is observed, $x_o, y_o, z_o$ denotes a 3D location of the environmental feature corresponding to the respective location in the correspondence information, and wherein $r_i$ denotes the distance from the center location of $i^{th}$ camera 1 to n to the respective intersection point $x_o, y_o, z_o$;
calculating a location of the intersection point P using iteration in accordance with the following equation $$P_{k+1} = P_k - (J_k^T J_k)^{-1} J_k^T f_k$$

wherein $P_k$ and $P_{k+1}$ are the calculated locations of the intersection point P for the $k^{th}$ and $k+1^{th}$ iteration,
wherein P is defined as $$P = \begin{bmatrix} x_0 \\ y_0 \\ z_0 \end{bmatrix}$$

wherein the matrix J and the matrix f are determined in accordance with the following equations:

$$J = \begin{bmatrix} \frac{df_1}{dx} & \frac{df_1}{dy} & \frac{df_1}{dz} \\ \frac{df_2}{dx} & \frac{df_2}{dy} & \frac{df_2}{dz} \\ \dots \\ \frac{df_n}{dx} & \frac{df_n}{dy} & \frac{df_n}{dz} \end{bmatrix},$$

$$f = \begin{bmatrix} f_1 \\ f_2 \\ \dots \\ f_n \end{bmatrix},$$

wherein $$\frac{df_1}{dx} \frac{df_1}{dy} \frac{df_1}{dz}, \frac{df_2}{dx} \frac{df_2}{dy} \frac{df_2}{dz} \text{ and } \frac{df_n}{dx} \frac{df_n}{dy} \frac{df_n}{dz}$$

are the partial derivatives of a cost function F along the x, y and z directions for the cameras 1 ... n, wherein the cost function F is defined as $\Sigma_{i=1}^{n} f_i^2$;
wherein iteration is used to gradually decrease the cost function F until the value of the cost function F is less than a threshold.

14. A method of generating a three-dimensional (3D) feature map, comprising:
capturing images from each of a plurality of cameras, wherein the cameras are located about a host object, the plurality of cameras comprising at least two front facing cameras having a front facing view of an environment in which the object is located, at least one left side facing camera having a left side facing view of the environment in which the object is located, at least one right side facing camera having a right side facing view of the environment in which the object is located, and at least one rear facing camera having a rear facing view of the environment in which the object is located;
selecting a group of images from the captured images, one captured image for each camera in the plurality of cameras, which were captured at a common time;

performing image distortion compensation on each image in the group of images based on intrinsic parameters of the respective camera that captured the image;

rectifying each image in the group of images so that all images in the group of images have a common image plane;

determining correspondence information for a plurality of environmental features for each image in the group of images in which a respective environmental feature is present based on a relative position and alignment of each camera in the plurality of cameras;

determining depth information for each environmental feature in the plurality of environmental features for each image in the group of images in which a respective environmental feature is present based on the correspondence information of the environmental features; and determining group optimized depth information for each environmental feature in the plurality of environmental features using the determined depth information of each respective environmental feature.

15. The method of claim 14, wherein for a respective location in the correspondence information for a respective environmental feature, a group optimized depth is determined, wherein the group optimized depth is defined by a vector x defined according to the following equation:

$$x = \begin{bmatrix} (x_o - x_1) \\ (y_o - y_1) \\ \dots \\ (z_o - z_1) \end{bmatrix}$$

wherein the vector x is calculated in accordance with the following equation:

$$x = A^+ b = (A^T A)^{-1} A^T b$$

wherein $A^+$ is the pseudoinverse of matrix A;

wherein the matrix A and the matrix b are calculated in accordance with the following equations:

$$A = \begin{bmatrix} x_2 - x_1, y_2 - y_1, z_2 - z_1 \\ x_3 - x_1, y_3 - y_1, z_3 - z_1 \\ \dots \\ x_n - x_1, y_n - y_1, z_n - z_1 \end{bmatrix},$$

$$b = \begin{bmatrix} \frac{1}{2}(r_1^2 - r_2^2 + l_{21}^2) \\ \frac{1}{2}(r_1^2 - r_3^2 + l_{31}^2) \\ \dots \\ \frac{1}{2}(r_1^2 - r_n^2 + l_{n1}^2) \end{bmatrix},$$

wherein $x_1, y_1, z_1, x_2, y_2, z_2 \dots x_n, y_n, z_n$ denote the center location of each camera 1 to n, respectively, wherein n is the number of cameras in which the respective environmental feature is observed, $x_o, y_o, z_o$ denotes a 3D location of the environmental feature corresponding to the respective location in the correspondence information, $r_1, r_2$ and $r_n$ denote the distance from the center location of each camera 1 to n to the respective intersection point $x_o, y_o, z_o$, and wherein $l_{21}, l_{31} \dots l_{n1}$ is the distance between the center location of the camera 1 and the center location of a camera i in which the respective environmental feature is observed, wherein i=2 . . . n.

16. The method of claim 14, wherein for a respective location in the correspondence information for a respective environmental feature, a group optimized depth is determined, wherein the group optimized depth is determined by:

calculating an observation error, f, for each camera in which a respective environmental feature is observed accordance with the following equation $$f_i = \sqrt{(x_o - x_i)^2 + (y_o - y_i)^2 + (z_o - z_i)^2} - r_i^2$$

wherein i refers the $i^{th}$ camera in which a respective environmental is observed, wherein $x_i, y_i, z_i$ denotes the center location of the $i^{th}$ camera, wherein i=1 . . . n, wherein n is the number of cameras in which the respective environmental feature is observed, $x_o, y_o, z_o$ denotes a 3D location of the environmental feature corresponding to the respective location in the correspondence information, and wherein $r_i$ denotes the distance from the center location of $i^{th}$ camera 1 to n to the respective intersection point $x_o, y_o, z_o$;

calculating a location of the intersection point P using iteration in accordance with the following equation $$P_{k+1} = P_k - (J_k^T J_k)^{-1} J_k^T f_k$$

wherein $P_k$ and $P_{k+1}$ are the calculated locations of the intersection point P for the $k^{th}$ and $k+1^{th}$ iteration, wherein P is defined as $$P = \begin{bmatrix} x_0 \\ y_0 \\ z_0 \end{bmatrix}$$

wherein the matrix J and the matrix f are determined in accordance with the following equations:

$$J = \begin{bmatrix} \frac{df_1}{dx} & \frac{df_1}{dy} & \frac{df_1}{dz} \\ \frac{df_2}{dx} & \frac{df_2}{dy} & \frac{df_2}{dz} \\ \dots \\ \frac{df_n}{dx} & \frac{df_n}{dy} & \frac{df_n}{dz} \end{bmatrix},$$

$$f = \begin{bmatrix} f_1 \\ f_2 \\ \dots \\ f_n \end{bmatrix},$$

wherein $$\frac{df_1}{dx} \frac{df_1}{dy} \frac{df_1}{dz}, \frac{df_2}{dx} \frac{df_2}{dy} \frac{df_2}{dz} \text{ and } \frac{df_n}{dx} \frac{df_n}{dy} \frac{df_n}{dz}$$

are the partial derivatives of a cost function F along the x, y and z directions for the cameras 1 . . . n, wherein the cost function F is defined as $\Sigma_{i=1}^{n} f_i^2$;

wherein iteration is used to gradually decrease the cost function F until the value of the cost function F is less than a threshold.

17. The method of claim 14, further comprising:
generating a three-dimensional (3D) feature map of the environment in which the object is located based on the group optimized position of each environmental feature in the plurality of environmental features.

18. The method of claim 17, further comprising:
displaying the 3D feature map of the environment in which the object is located on a display.

19. The method of claim 17, further comprising:
outputting the 3D feature map of the environment in which the object is located to a vehicle driver assistance system or autonomous vehicle system.

20. The method of claim 14, further comprising:
calculating a maximum likelihood estimation in accordance with a noise distribution model for each environmental feature in each image in which the environmental feature appears.

21. The method of claim 20, further comprising:
outputting the maximum likelihood estimations for each feature to a vehicle driver assistance system or autonomous vehicle system.

22. The method of claim 14, wherein, when selecting the group of images from the captured images, one captured image for each camera in the plurality of cameras in accordance with a time stamp of each image such that images in the group of images were captured at a common time.

23. A non-transitory machine readable medium having tangibly stored thereon executable instructions for execution by at least one processor of a computer vision system, the computer vision system comprising a processor, a memory coupled to the processor, and a plurality of cameras coupled to the processor, wherein the cameras are located about a host object, the plurality of cameras comprising at least two front facing cameras having a front facing view of an environment in which the object is located, at least one left side facing camera having a left side facing view of the environment in which the object is located, at least one right side facing camera having a right side facing view of the environment in which the object is located, and at least one rear facing camera having a rear facing view of the environment in which the object is located, wherein the executable instructions, when executed by the at least one processor, cause the computer vision system to:
select a group of images from images captured by the plurality of cameras, the group of images including one captured image for each camera in the plurality of cameras, which were captured at a common time;
perform image distortion compensation on each image in the group of images based on intrinsic parameters of the respective camera that captured the image;
rectify each image in the group of images so that all images in the group of images have a common image plane;
determine correspondence information for a plurality of environmental features for each image in the group of images in which a respective environmental feature is present based on a relative position and alignment of each camera in the plurality of cameras;
determine depth information for each environmental feature in the plurality of environmental features for each image in the group of images in which a respective environmental feature is present based on the correspondence information of the environmental features; and
determine group optimized depth information for each environmental feature in the plurality of environmental features using the determined depth information of each respective environmental feature.

\* \* \* \* \*

UNITED STATES PATENT AND TRADEMARK OFFICE
CERTIFICATE OF CORRECTION

PATENT NO. : 10,643,342 B2
APPLICATION NO. : 15/891951
DATED : May 5, 2020
INVENTOR(S) : Haiwei Dong, Yuan Ren and Keyvan Golestan Irani It is certified that error appears in the above-identified patent and that said Letters Patent is hereby corrected as shown below:

In the Specification

In Column 13, Line 20:
"sphere, the center locations denoted $x_2,y_2,z_2$ and $x_3,y3,z_3$"
Should read:
-- sphere, the center locations denoted $x_1,y_1,z_1$, $x_2,y_2,z_2$ and $x_3,y_3,z_3$ --

In Column 13, Line 45 (Equation 5):
$$(x_o - x_j) + (y_o - y_j) + (z_o - z_j)(z_i - z_j) = \tfrac{1}{2}(r_j^2 - r_i^2 + l_{ij}^2),$$
Should read:
$$(x_o - x_j)(x_i - x_j) + (y_o - y_j)(y_i - y_j) + (z_o - z_j)(z_i - z_j) = \tfrac{1}{2}(r_j^2 - r_i^2 + l_{ij}^2)$$

In Column 14, Line 50, the definition of cost function F should appear as:
$\sum_{i=1}^{n} f_i^2.$ In Column 14, Line 54, Formula 13 should appear as:
$\min F = min \sum_{i=1}^{n} f_i^2.$ In the Claims In Column 20, Line 48 (Claim 13), the definition of cost function F should appear as:
$\sum_{i=1}^{n} f_i^2.$ In Column 22, Line 64 (Claim 16), the definition of cost function F should appear as:
$\sum_{i=1}^{n} f_i^2$ Signed and Sealed this
Eighth Day of August, 2023

Katherine Kelly Vidal
*Director of the United States Patent and Trademark Office*